United States Patent [19]

Preus

[11] 4,382,794
[45] May 10, 1983

[54] INSTRUCTIONAL AID

[76] Inventor: Ann M. Preus, 60 Seymour Ave., SE., Minneapolis, Minn. 55414

[21] Appl. No.: 232,121

[22] Filed: Feb. 6, 1981

[51] Int. Cl.³ .............................................. G09B 23/02
[52] U.S. Cl. .................................... 434/193; 434/195; 434/207
[58] Field of Search ............... 434/193, 194, 195, 205, 434/207

[56] References Cited

U.S. PATENT DOCUMENTS

| | | | |
|---|---|---|---|
| 2,635,355 | 4/1953 | Thompson | 434/195 |
| 3,204,343 | 9/1965 | Pollock | 434/195 |
| 3,381,394 | 5/1968 | Munro | 434/193 |
| 3,414,986 | 12/1968 | Stassen | 434/195 |
| 3,766,667 | 10/1973 | Glassman | 434/195 |
| 3,934,357 | 1/1976 | Couvillion | 434/193 |
| 4,146,977 | 4/1979 | Barberi | 434/207 |

FOREIGN PATENT DOCUMENTS 264034  6/1964  Netherlands ....................... 434/207

Primary Examiner—Harland S. Skogquist
Attorney, Agent, or Firm—Dorsey & Whitney

[57] ABSTRACT

An instructional aid consisting of a plurality of objects useful in teaching and understanding basic concepts of number, addition, subtraction, multiplication and division. Each of the objects in the plurality corresponds to some integer number between one and ten and has a thickness representing the number to which it corresponds. Moreover, each object has a surface having a color or combination of colors representing the prime number or composite number to which it corresponds. The surface having such color or combination of colors has the shape of the Arabic numeral representing the number to which the object corresponds. Alternatively, this surface has the shape of a symmetrical figure with a number of sides equal to the value of the number to which the object corresponds. As a further alternative, this surface consists of a linear composite of unit surfaces, the number of such unit surfaces being equal to the value of the number to which the object corresponds.

6 Claims, 24 Drawing Figures

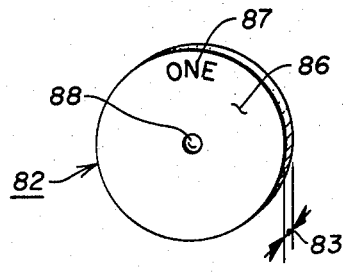
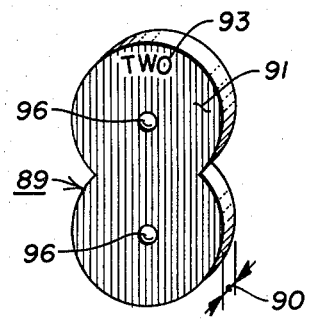
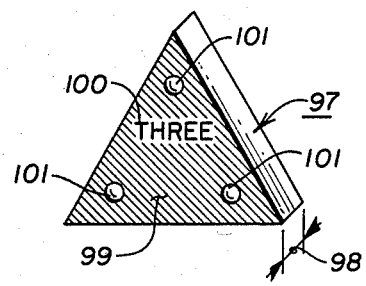
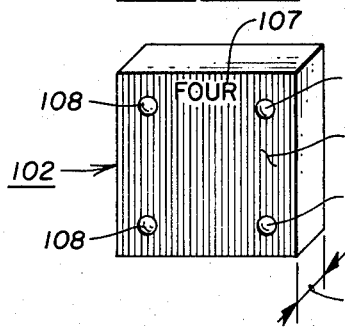
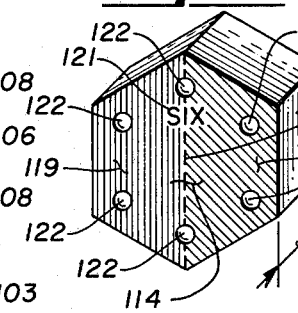
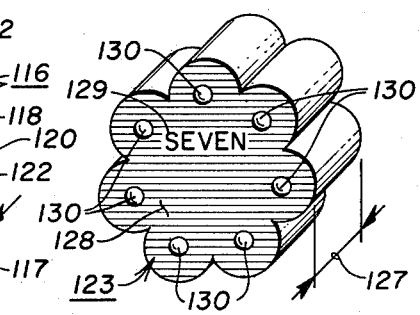
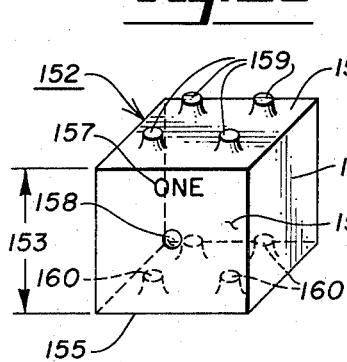
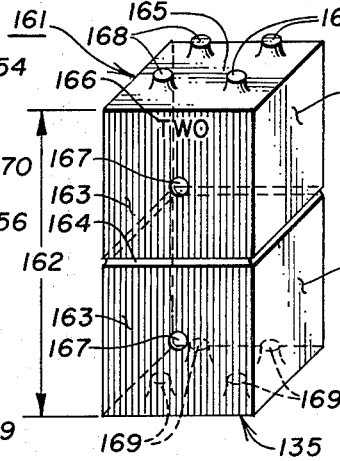
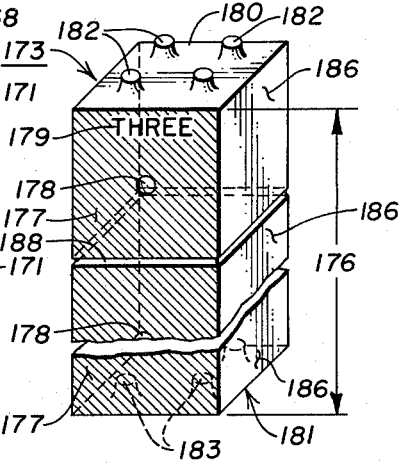
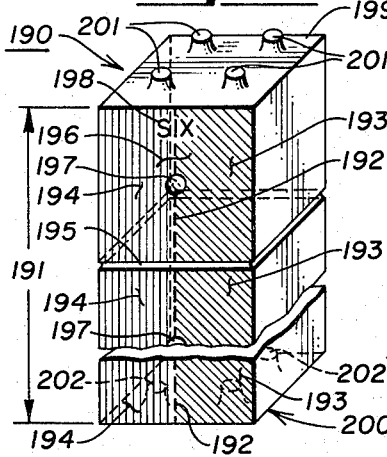
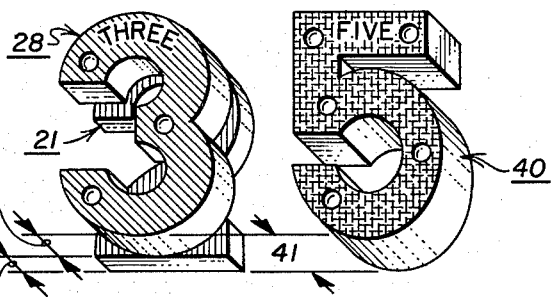

INSTRUCTIONAL AID

BACKGROUND OF THE INVENTION

The present invention relates generally to an instructional aid, and more particularly to an instructional aid having a plurality of objects, each with a color reflecting the number represented by the object, which are useful in clarifying and solidifying the concepts of addition, subtraction, multiplication, and division, understanding the relationship between prime and composite numbers, and improving number skills and memory. The basic concept of adding two numbers together to obtain the sum, or multiplying two numbers together to obtain the product, has been well known in the field of mathematics for a long time. While many methods are used to teach and understand these concepts, the most common method is to memorize the addition and multiplication tables.

While conventional methods such as memorization may be satisfactory for some students, many students have difficulty grasping the concepts of addition, subtraction, multiplication, and division, notwithstanding the availability of such tables. The reason is that the memorization method generally presupposes that a student has already grasped the crucial concepts of addition, subtraction, multiplication, and division. Moreover, multiplication tables fail to provide the student with a means for understanding the relationship between prime and composite numbers and yet these concepts are important to a basic understanding of multiplication and division.

Methods which do attempt to teach the concepts of number, addition, subtraction, multiplication, and division often fail to supplement the abstract aspects of these concepts with visual and tactile experiences. Accordingly, there is a real need in the art for an improved method and corresponding means for teaching these concepts to persons with learning disabilities. Especially needed are means which not only aid in teaching the addition and multiplication tables but which also give a basic understanding of number synthesis and which reinforce that understanding with visual and tactile experiences.

SUMMARY OF THE INVENTION

The present invention relates to an instructional aid having a plurality of objects enabling one to easily teach, understand, and remember the basic concepts of addition, subtraction, multiplication, and division by using color, structure, and manipulation in a designated way. In the preferred embodiment each of the objects in the plurality corresponds to some integer number between one and ten and each integer between one and ten has at least one object corresponding to it. That is, there is at least one object corresponding to each of the numbers one through ten. Each object has a thickness and a weight which is respectively a multiple of a unit thickness and a unit weight, the multiplier being the value of the number to which the object corresponds. Moreover, each of the objects in the plurality further has at least one surface being of a color or combination of colors representing the prime number or the prime factors of the composite number to which it corresponds. Each object's surface which is such a color or combination of colors has the shape of the Arabic numeral representing the number to which the object corresponds, with the exception of the object corresponding to the number ten wherein this surface has the shape of the Arabic numeral representing the number one. As a first alternative embodiment, each object's surface which is such a color combination of colors has a perimeter which defines a shape having a number of sides (or integer multiple thereof) equal to the value of the number to which the object corresponds.

In particular, the thickness (or weight) of the various objects is used to show and demonstrate the concepts of addition and subtraction. For example, the object corresponding to the number two has the shape of the Arabic numeral "2" with thickness of two units, or alternatively a two sided figure having a thickness of two units. The objects corresponding to the number three has the shape of the Arabic numeral "3" with a thickness of three units, or alternatively a three sided figure having a thickness of three units. The object corresponding to the number five has the shape of the Arabic numeral "5" with a thickness of five units, or alternatively a five sided figure having a thickness of five units. Stacking the object corresponding to the number three on top of the object corresponding to the number two yields a pair of objects having a combined thickness equal to the thickness of the object corresponding to the number five. Complementary procedures demonstrate the concept of subtraction. For example, given that the objects corresponding to the numbers three and two have a combined thickness of five, the fact that taking away the object corresponding to the number two leaves a thickness of three units demonstrates that five minus two equals three.

The present invention also uses color and color codes to show and demonstrate the concepts of multiplication and division, based on the theorem that every composite number can be expressed uniquely as the product of prime numbers. Color aids in demonstrating this concept by associating a different color with each of the prime numbers under eleven (i.e., two, three, five, and seven) and associating a color combination with each of the composite numbers under eleven (i.e., four, six, eight, nine, and ten) which reflects the colors of the prime numbers whose products equal such composite numbers, and coloring the surface having the shape of the corresponding Arabc numeral with that color or combination of colors. Thus, color is used to stimulate and reinforce understanding of the concepts of multiplication and division in the sense that composite numbers may be expressed uniquely as the product of prime numbers.

To aid those with learning disabilities to recognize and associate the value with the name of each number, each of the objects has the English name of the number to which it corresponds imprinted on the surface bearing said color or combination of colors. For example, the English name "two" is imprinted on the colored surface of the object corresponding to the number two. Moreover, the colored surfaces have a number of holes therein equal to the value of the number to which the objects correspond. This enables counting the holes by touch or by pegs placed in or withdrawn from the holes as an aid in understanding the value of the number. It further enables demonstrating, for example, that the pegs withdrawn from the objects corresponding to the numbers one and two fill the holes in the object corresponding to the number three.

In a second alternative embodiment, the surface of each object having said color or combination of colors consists of a linear composite of unit surfaces, the number of such unit surfaces being equal to the value of the number to which the object corresponds. The dimension representing the value of the number to which the object corresponds is the height of the linear composite of surfaces. Each object has means for linearly connecting itself to another object of the plurality. As where the thickness of the objects was used to demonstrate addition for the above described object, the height of the objects in this embodiment is useful for demonstrating addition.

With respect to the preferred, the first alternative, and the second alternative embodiments, each of the objects in the particular embodiment corresponds to some integer number between one and ten and additionally all of the integers between one and ten have at least one object corresponding to them. That is, for these embodiments, there is at least one object corresponding to each number between one and ten. For example, the preferred embodiment includes the plurality of objects where the objects have the characteristics described above and where there is one object corresponding to the number one, there is one object corresponding to the number two, etc. up through the number ten. Similarly, the preferred embodiment includes the plurality of objects where the objects have the characteristics described above and where there are several objects corresponding to the number one, there are several objects corresponding to the number two, etc. up through the number ten. Furthermore, another example of the preferred embodiment includes the plurality where the objects have the characteristics described above and where there (is) are one, several, or many objects corresponding to the number two, etc. up through ten.

Further alternatives to the preferred, the first alternative, and the second alternative embodiments are those in which each object corresponds to some integer number between one and ten but only certain of the integers between one and ten have at least one object corresponding to them. For example, those objects of the preferred embodiment corresponding to each of the numbers two through nine constitute such a further alternative to the preferred embodiment, Similarly, those objects of the first alternative embodiment corresponding to each of the numbers two, three, five, and seven constitute such a further alternative to the first alternative embodiment. In order to facilitate referring to both the preferred, the first alternative, and the second alternative embodiments and the further alternatives to these embodiments, the expression "each of the objects corresponds to some integer number between one and ten" shall mean, unless qualified, that each object corresponds to some integer number berween one and ten and that either certain of the integers or all of the integers one through ten have at least one object corresponding to it.

Accordingly, an object of the present invention is to provide an instructional aid useful for teaching the concepts of addition, subtraction, multiplication and division. A further object of the present invention is to provide a representation of a fundamental law of arithmetic; namely, that non-prime numbers may be expressed by prime numbers through application of the operations of arithmetic.

DESCRIPTION OF THE DRAWINGS

FIGS. 2a through 2f are orthographic views of first alternative embodiment objects corresponding respectively to the integer numbers one though four, six and seven.

FIGS. 3a through 3d are orthographic views of second alternative embodiment objects corresponding respectively to the integer numbers one, two, three, and six.

FIG. 4 is an orthographic view of an object corresponding to the number three stacked upon an object corresponding to the number two, and an object corresponding to the number five, the stack being aligned with the latter object.

DESCRIPTION OF THE PREFERRED AND ALTERNATIVE EMBODIMENTS

Figure 1A:
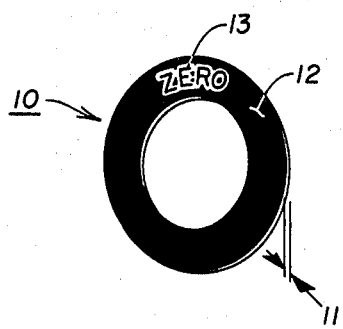
FIGS. 1a through 1k are orthographic views of the objects corresponding respectively to the integer numbers zero through ten.
Figure 1B:
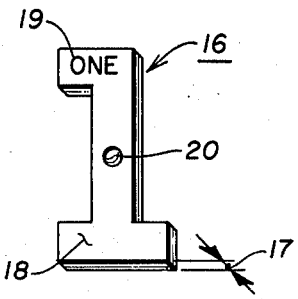
Figure 1C:
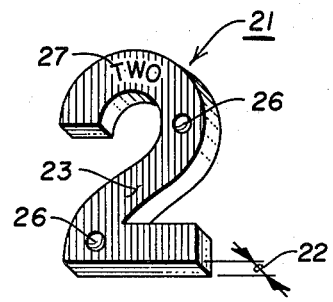
Figure 1D:
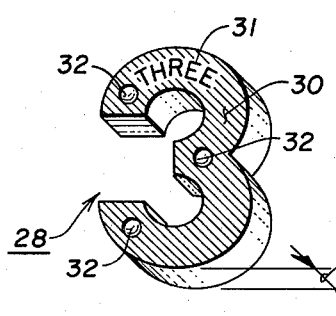
Figure 1E:
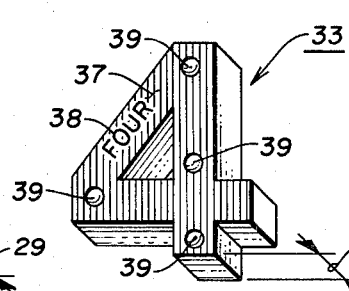
Figure 1F:
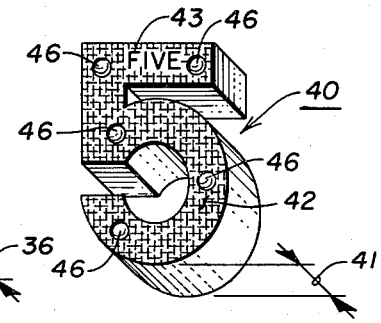
Figure 1G:
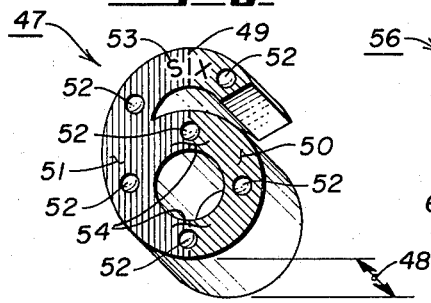
Figure 1H:
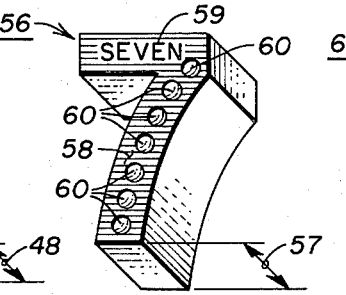
Figure 1I:
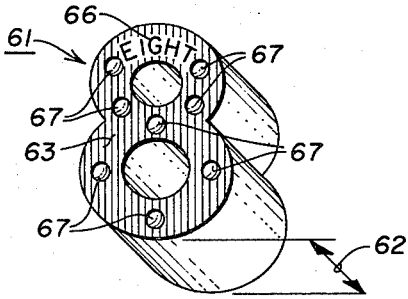
Figure 1J:
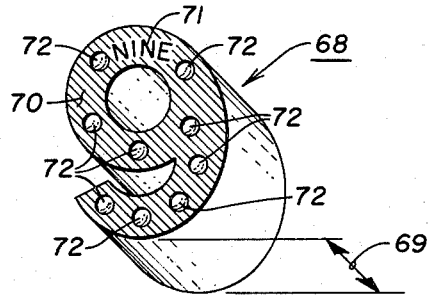
Figure 1K:
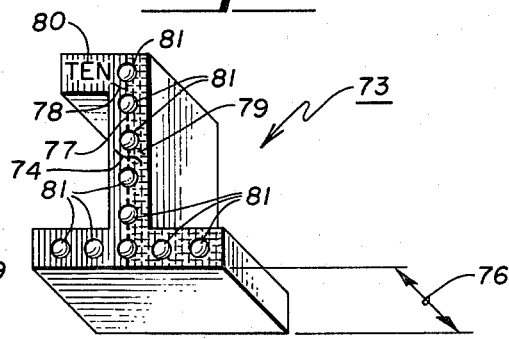

The preferred embodiment of the present invention comprises the objects illustrated in FIGS. 1b through 1k. Referring to FIG. 1b, object 16 corresponds to the integer one, has a thickness 17 of one unit, its actual thickness is a matter of choice, and has a weight of one unit, its actual weight depending upon the materials out of which it is constructed. Object 16 has a surface 18 having the shape of the Arabc numeral representing the number one. Surface 18 is colored white in FIG. 1b, but it could be uncolored as well. Surface 18 also has the work "ONE," indicated as 19, imprinted thereon, and has a hole 20 therein, said hole 20 adapted to receive a peg (not shown). Referring to FIG. 1c, object 21 corresponds to the integer two, has a thickness 22 of two units and weighs two units relative to object 16, and has a surface 23 having the shape of the Arabic numeral representing the number two. Surface 23 is colored red, has the word "TWO," indicated as 27, imprinted thereon, and has two holes 26 therein, each hole 26 adapted to receive a peg (not shown). Referring to FIG. 1d, object 28 corresponds to the integer three, has a thickness 29 of three units and weighs three units relative to object 16, and has a surface 30 having the shape of the Arabic numeral representing the number three. Surface 30 is colored green, has the word "THREE," indicated as 31, imprinted thereon, and has three holes 32 therein, each hole 32 adapted to receive a peg (not shown). Referring to FIG. 1e, object 33 corresponds to the integer four, has a thickness 36 of four units and weighs four units relative to object 16, and has a surface 37 having the shape of the Arabic numeral representing the number four. Surface 37 is colored red, has the word "FOUR," indicated as 38, imprinted thereon, and has four holes 39 therein, each hole 39 adapted to receive a peg (not shown). Referring to FIG. 1f, object 40 corresponds to the integer five, has a thickness 41 of five units and weighs five units relative to object 16, and has a surface 42 having the shape of the Arabic numeral representing the number five. Surface 40 is colored yellow, has the word "FIVE," indicated as 43, imprinted thereon, and has five holes 46 therein, each hole 46 adapted to receive a peg (not shown). Referring to FIG. 1g, object 47 corresponds to the integer six, has a thickness 48 of six units and weighs six units relative to object 16, and has a surface 54 having the shape of the Arabic numeral representing the number six. Surface 54 is divided into portions 50 and 51 by line of demarcation 49. Portions 50 and 51 are colored red and green respectively. Surface 54 has the word "SIX," indicated as 53, imprinted thereon, and has six holes 52 therein, each hole 52 adapted to receive a peg (not shown). Referring to FIG. 1h, object 56 corresponds to the integer seven, has a thickness 57 of seven units and weighs seven units relative to object 16, and has a surface 58 having the shape of the Arabic numeral representing the number seven. Surface 58 is colored blue, has the word "SEVEN," indicated as 59, imprinted thereon, and has seven holes 60 therein, each hole 60 adapted to receive a peg (not shown). Referring to FIG. 1i, object 61 corresponds to the integer eight, has a thickness 62 of eight units and weighs eight units relative to object 16, and has a surface 63 having the shape of the Arabic numeral representing the number eight. Surface 63 is colored red, has the word "EIGHT," indicated as 66, imprinted thereon, and has eight holes 67 therein, each hole 67 adapted to receive a peg (not shown). Referring to FIG. 1j, object 68 corresponds to the integer nine, has a thickness 69 of nine units and weighs nine units relative to object 16, and has a surface 70 having the shape of the Arabic numeral representing the number nine. Surface 70 is colored green, has the word "NINE," indicated as 71, imprinted thereon, and has nine holes 72 therein, each hole 72 adapted to receive a peg (not shown). Referring to FIG. 1k, object 73 corresponds to the integer ten, has a thickness 76 of ten units and weighs ten units relative to object 16, and has a surface 74 having the shape of the Arabic numeral representing the number one. Surface 74 is divided into portions 78 and 79 by line of demarcation 77. Portions 78 and 79 are colored red and yellow respectively. Surface 74 has the word "TEN," indicated as 80, imprinted thereon, and has ten holes 81 therein, each hole 81 adapted to receive a peg (not shown).

Referring to FIG. 1a, object 10 corresponds to the integer zero, has a negligible thickness 11 and a negligible weight relative to object 16. Object 10 also has a surface 12 having the shape of the Arabic numeral representing the number zero. Surface 13 is colored black in FIG. 1a, but it could be uncolored or transparent as well. Surface 12 also has the word "ZERO," indicated as 13, imprinted thereon, and does not have any holes therein for receiving pegs. Object 10 might be used to supplement the preferred embodiment objects which correspond to the numbers one through ten.

The first alternative embodiment of the present invention comprises in part the objects illustrated in FIGS. 2a through 2f. Referring to FIG. 2a, object 82 corresponds to the integer one, has a thickness 83 of one unit, its actual thickness is a matter of choice, and has a surface 86 having the shape of a circle. Surface 86 is colored white in FIG. 2a, but it could be uncolored as well. Surface 86 also has the word "ONE," indicated as 19 imprinted thereon, and has a hole 88 therein, said hole 88 adapted to receive a peg (not shown). Referring to FIG. 2b, object 89 corresponds to the integer two, has a thickness 90 of two units in relation to object 82, and has a surface 91 having the shape of two overlapping circles. Surface 91 is colored red, has the word "TWO," indicated as 93, imprinted thereon, and has two holes 96 therein, each hole 96 adapted to receive a peg (not shown). Referring to FIG. 2c, object 97 corresponds to the integer three, has a thickness 98 of three units in relation to object 82, and has a surface 99 having the shape of a triangle. Surface 99 is colored green, has the word "THREE," indicated as 100, imprinted thereon, and has three holes 101 therein, each hole 101 adapted to receive a peg (not shown). Referring to FIG. 2d, object 102 corresponds to the integer four, has a thickness 103 of four units in relation to object 82, and has a surface 106 having the shape of a square. Surface 106 is colored red, has the word "FOUR," indicated as 107, imprinted thereon, and has four holes 108 therein, each hole 108 adapted to receive a peg (not shown). Referring to FIG. 2e, object 116 corresponds to the integer six, has a thickness 117 of six units in relation to object 82, and has a surface 114 having the shape of a hexagon. Surface 114 is divided into portions 119 and 120 by line of demarcation 118. Portions 119 and 120 are colored red and green respectively. Surface 114 has the word "SIX," indicated as 121, imprinted thereon, and has six holes 122 therein, each hole 122 adapted to receive a peg (not shown). Referring to FIG. 2f, object 123 corresponds to the integer seven, has a thickness 127 of seven units in relation to object 82, and has a surface 128 having the shape of a seven sided figure, each side comprising an identical portion of a circle. Surface 128 is colored blue, has the word "SEVEN," indicated as 129, imprinted thereon, and has seven holes 130 therein, each hole 130 adapted to receive a peg (not shown). In light of the apparent redundancy of the objects within the first alternative embodiments, drawings of the objects corresponding to the integers five, eight, nine, and ten are not provided herein. The following description of those objects for which drawings were omitted should be understood with reference to FIGS. 1a through 1f. The object corresponding to the integer five has a thickness of five units in relation to object 82, and has a surface having the shape of a pentagon. Alternatively, this surface could have the shape of a star; that is, a symmetrical ten sided figure having five outer vertices and five inner vertices. This surface is colored yellow, has the word "FIVE" imprinted thereon, and has five holes therein, each hole adapted to receive a peg. The object corresponding to the integer eight has a thickness of eight units in relation to object 82, and has a surface having the shape of an octagon. This surface is colored red, has the word "EIGHT" imprinted thereon, and has eight holes therein, each hole adapted to receive a peg. The object corresponding to the integer nine has a thickness of nine units in relation to object 82, and has a surface having the shape of a nine sided figure, each side comprising an identical portion of a circle. This surface is colored green, has the word "NINE" imprinted thereon, and has nine holes therein, each hole adapted to receive a peg. The object corresponding to the integer ten has a thickness of ten units in relation to object 82, and has a surface having the shape of a decagon. This surface is divided into two equal portions by a straight line of demarcation passing through a pair of opposing vertices. One portion is colored red while the other portion is colored yellow. This surface has the word "TEN" imprinted thereon, intersecting the line of demarcation. The surface has ten holes therein, each adapted to receive a peg.

In summary, the preferred embodiment of the present invention comprises a plurality of objects where each object corresponds to some integer between one and ten and additionally all of the integers between one and ten have at least one object corresponding to them. Each object has a thickness representing the number to which it corresponds, namely an integer multiple of a unit thickness, the multiplier being the value of the number to which the object corresponds, except where the number is zero, whereupon the thickness is negligible. Each object has a weight representing the number to which it corresponds, namely an integer multiple of the unit weight of the object corresponding to the number one. Each object further includes at least one surface having the shape of the Arabic numeral representing the number to which the object corresponds. This surface has as many holes, each adapted to receive a peg, as the value of the corresponding number. Finally, this surface is colored according to the number to which the object corresponds, differentiation made for prime and composite numbers. The objects can be constructed of wood, metal, plastic, or other suitable materials. The first alternative embodiment differs principally from the preferred embodiment in that the surface being of the color or combination of colors representing the number to which the object corresponds defines a shape having a number of sides equal to the number (or an integer multiple thereof) to which the object corresponds.

The preferred and first alternative embodiments of the present invention enable one to easily teach the concept of addition. Referring to FIG. 4, objects 21, 28, and 40 correspond respectively to the integers two, three, and five. The combined thicknesses 22 and 29 respectively of objects 21 and 28, as when those two objects are stacked one upon the other, equals the thickness 41 of object 40. Thus, the well known truth of addition, that two plus three equals five, is given concrete meaning. Of course, objects from the first alternative embodiment would demonstrate this truth of addition equally well because the objects corresponding respectively to the integers two, three, and five each have an appropriate thickness.

Figure 5:
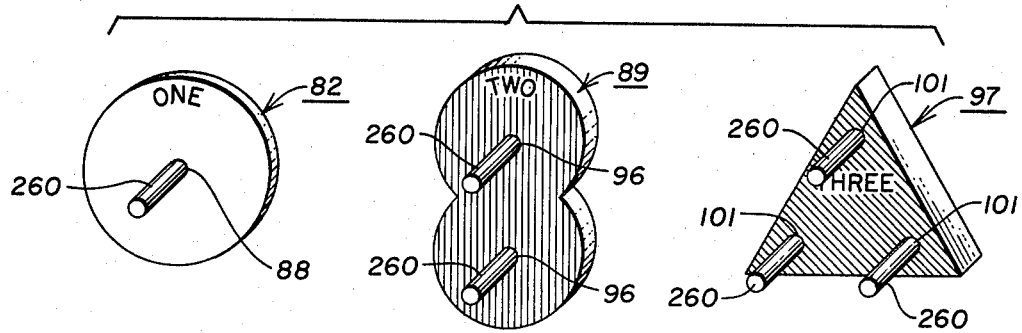
FIG. 5 is an orthographic view of first alternative embodiment objects corresponding respectively to the numbers one, two, and three, each with pegs inserted into holes adapted to receive such pegs.

The preferred and first alternative embodiments of the present invention enable one to easily teach the concept of addition in another way. Referring to FIG. 5, the truth of addition, that one plus two equals three, is demonstrated by the fact that peg 260 in hole 88 of object 82 and the two pegs 260 in holes 96 of object 89 exactly fill the three holes 101 in object 97.

The preferred and first alternative embodiments of the present invention enable one to easily teach the concept of multiplication. The objects are color coded to reflect the prime number or the prime number factor or factors of the number they represent. Each of the prime numbers from zero through ten is colored with a different, visually distinct color. For example, objects corresponding to the integer two are colored red, those corresponding to three are green, those corresponding to five are yellow, and those corresponding to seven are blue. The composite numbers are colored to reflect the prime numbers whose product equals the composite number in question. For example, the objects corresponding to the integer four are colored red, because two is the prime factor of four, i.e., two times two equals four. The objects corresponding to the integer six are colored red and green because two and three are the prime factors of six. The objects corresponding to the integer eight are colored red, because two is the prime factor of eight, i.e., two times two times two equals eight. The objects corresponding to the integer nine are colored green because three is the prime factor of nine. The objects corresponding to the integer ten are colored red and yellow because two and five are the prime factors of ten.

The relationship of prime factors to the corresponding composite number is made concrete by manipulating the objects corresponding to the numbers. For example, because the prime factors of ten are two and five, two objects corresponding to the integer five, when stacked one upon the other, have a combined thickness equal to the thickness of the object corresponding to the integer ten. Similarly, five objects corresponding to the integer two, when stacked one upon another, have a combined thickness equal to the thickness of the object corresponding to the integer 10.

A second alternative embodiment of the present invention comprises in part the objects illustrated in FIGS. 3a through 3d. Referring to FIG. 3a, object 152 corresponds to the integer one, and is a cube with a height 153 of one unit, the actual height is a matter of choice. Front face 156 is colored white in FIG. 3a, and alternatively other faces such as side face 170 can also be colored white. As a further alternative, front face 156 can be left uncolored. Front face 156 has the word "ONE," indicated as 157, imprinted thereon, and has one hole 158 therein, said hole adapted to receive a peg. Top face 154 has means for linearly connecting object 152 to another object of the plurality, said connection means comprising, for example, four protuberant members 159. Bottom face 155 has means for linearly connecting object 152 to another object of the plurality, said connection means comprising, for example, four apertures 160 adapted and aligned to securely receive protuberant members similar to protuberant members 159.

Referring to FIG. 3b, object 161 corresponds to the integer two, and is a parallelepiped with a height 162 of two units in relation to object 152. Two front faces 163, separated by a sunken ridge 164, are colored red, and each front face 163 has a hole 167 therein, said holes adapted to receive a peg. Alternatively, other faces such as side faces 171 can also be colored red. The uppermost of front faces 163 can have the word "TWO," indicated as 166, imprinted thereon. Top face 165 has means for linearly connecting object 161 to another object of the plurality, said connection means comprising, for example, four protuberant members 168. Bottom face 135 has means for linearly connecting object 152 to another object of the plurality, said connection means comprising, for example, four apertures 169 adapted and aligned to securely receive protuberant members similar to protuberant members 159.

Referring to FIG. 3c, object 173 corresponds to the integer three, and is a parallelepiped with a height 176 of three units in relation to object 152. Three identically shaped front faces 177 (portions of the lower two faces are not shown in FIG. 3c) are separated by sunken ridges 188, are colored green, and each front face 177 has a hole 178 therein, said holes adapted to receive a peg. Alternatively, other faces such as side faces 186 can also be colored green. The uppermost of the front faces 177 can have the word "THREE," indicated as 179, imprinted thereon. Top face 180 has means for linearly connecting object 173 to another object of the plurality, said connection means comprising, for example, four protuberant members 182. Bottom face 181 has means for linearly connecting object 173 to another object of the plurality, said connection means comprising, for example, four apertures 183 adapted and aligned to securely receive a protuberant members similar to protuberant members 159.

Referring to FIG. 3d, object 190 corresponds to the integer six, and is a parallelepiped with a height 191 of six units in relation to object 152. Six identically shaped front faces 196 has a hole 197 therein, said holes adapted to receive a peg. Each front face 194 is divided into equal portions 193 and 194 by a vertical line of demarcation 192. Portions 193 and 194 are colored red and green respectively. The uppermost of front face 194 can have the word "SIX," indicated as 198, imprinted thereon. Top face 199 has means for linearly connecting object 190 to another object of the plurality, said connection means comprising, for example, four protuberant members 201. Bottom face 200 has means for linearly connecting object 190 to another object of the plurality, said connection means comprising, for example, four apertures 202 adapted and aligned to securely receive protuberant members similar to protuberant members 159.

Not shown in the FIGS. 3a through 3d are the objects corresponding to the integers four, five, seven, eight, nine, and ten. However, these objects are not different in principal from those shown in FIGS. 3a through 3d. Each object is a parallelepiped. It's top face can have four protuberances and its bottom face can have four apertures identical to those described for the objects shown in FIGS. 3a through 3d. Each object has a height equal to a multiple of a unit height and a number of front faces corresponding to the value of the number to which it corresponds. The front faces are separated by sunken ridges, have one hole therein, each adapted to receive a peg, and are colored according to the color code set forth in the preferred embodiment and the color scheme illustrated in FIGS. 3a through 3d. The uppermost front face of each object has the English name of the number to which the object corresponds.

Figure 6:
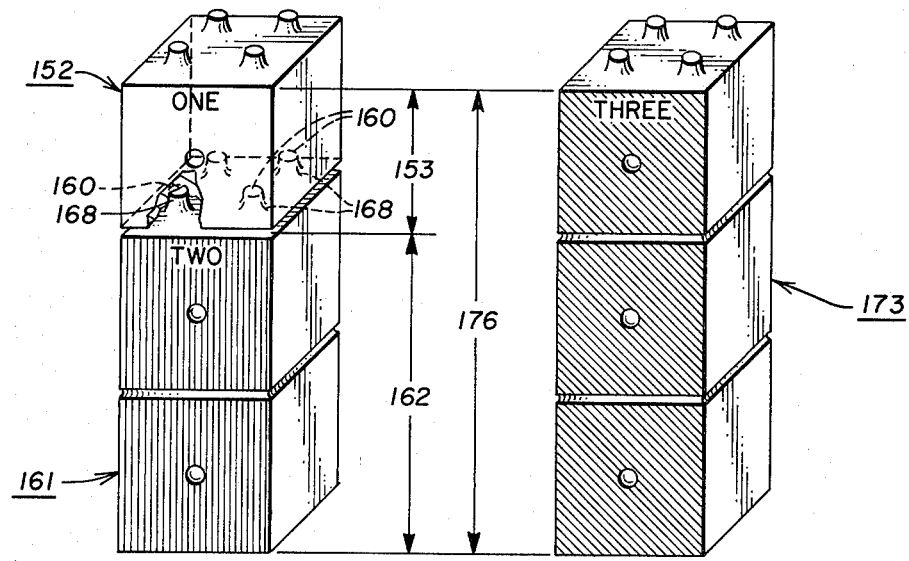
FIG. 6 is an orthographic view of the second alternative embodiment object corresponding to the number one stacked upon an object corresponding to the number two, and an object corresponding to the number three, the stack being aligned with the latter object.

The second alternative embodiment set forth immediately above serves to aid in teaching the concepts of addition and multiplication in the manner described for the preferred and first alternative embodiment. The second alternative embodiment differs principally from the other two embodiments in that connection means may be provided on the top and bottom faces of each object to facilitate stacking the objects. FIG. 6 shows object 152 stacked on top of object 161. Protuberances 168 on the top face of object 161 are securely received by apertures 160 in the bottom face of object 161. FIG. 6 demonstrates the truth of addition that one plus two equals three: Height 153 of object 152 and height 162 of object 161 are equal to the height 176 of object 173. Of course, other combinations of objects may be similarly stacked to demonstrate the simple truths of addition.

Further alternatives to the preferred, the first alternative, and the second alternative embodiments include those in which each object corresponds to some integer number between one and ten but only certain of the integers between one and ten have at least one object corresponding to them. For example, the plurality of objects 21, 28, 40 and 56 of FIGS. 1c, 1d, 1f, and 1h respectively constitutes a further alternative to the preferred embodiment. Similar examples could be given for further alternatives to the preferred, first, and second alternative embodiments.

Although the description of the preferred and alternative embodiments of the present invention have been quite specific, it is contemplated that various modifications could be made to the present invention without deviating from the spirit thereof. Accordingly, it is intended that the scope of the present invention be dictated by the appended claims rather than by the description of the preferred or alternative embodiments.

I claim:
1. An instructional aid comprising:
   a plurality of objects in which each of said objects:
   (a) corresponds to some integer number from one to ten inclusive,
   (b) has a thickness dimension which represents the relative value of the number to which it corresponds,
   (c) has the shape of the Arabic numeral representing the number to which the object corresponds, with the exception of the object corresponding to the number ten where that object has the shape of the Arabic numeral representing the number one.
   (d) has at least one surface being of a color or combination of colors representing the prime number or the prime factors of the composite number to which it corresponds, wherein:
      (i) said one surface of each of the objects corresponding to the prime numbers two, three, five and seven is a different color,
      (ii) said one surface of each of the objects corresponding to the composite numbers four and eight is the same color as the color of said one surface of the object corresponding to the prime number two,
      (iii) said one surface of the object corresponding to the composite number nine is the same color as the color of said one surface of the object corresponding to the prime number three,
      (iv) said one surface of the object corresponding to the composite number six is divided into two portions, one portion being of the same color as the color of said one surface of the object corresponding to the prime number two, and the other portion being of the same color as the color of said one surface of the object corresponding to the prime number three, and
      (v) said one surface of the object corresponding to the composite number ten is divided into two portions, one portion being of the same color as the color of said one surface of the object corresponding to the prime number two and the other portion being of the same color as the color of said one surface of the object corresponding to the prime number five.

2. The instructional aid of claim 1, wherein the thickness of each object is a multiple of a unit thickness, the multiplier being the value of the number to which the object corresponds.

3. The instructional aid of claim 2, wherein each object has a weight equal in value to a multiple of a unit weight, the multiplier being the value of the number to which the object corresponds.

4. The instructional aid of claim 1, wherein at least one of said surfaces of each objects bearing said color or combination of colors has a number of holes therein equal to the value of the number to which the object corresponds.

5. The instructional aid of claim 4, wherein said holes are adapted to receive a peg.

6. The instructional aid of claim 1, wherein at least one of said surfaces of each object being of said color or combination of colors has on it the name of the number to which the object corresponds.

* * * * *